United States Patent
Vaystikh et al.

(10) Patent No.: US 9,154,516 B1
(45) Date of Patent: Oct. 6, 2015

(54) DETECTING RISKY NETWORK COMMUNICATIONS BASED ON EVALUATION USING NORMAL AND ABNORMAL BEHAVIOR PROFILES

(71) Applicant: EMC Corporation, Hopkinton, MA (US)

(72) Inventors: Alex Vaystikh, Hod Hasharon (IL); Ereli Eran, Tel Aviv (IL); Eyal Kolman, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 76 days.

(21) Appl. No.: 14/039,881

(22) Filed: Sep. 27, 2013

(51) Int. Cl.
  *G06F 15/173* (2006.01)
  *H04L 29/06* (2006.01)
(52) U.S. Cl.
  CPC .................................. *H04L 63/1425* (2013.01)
(58) Field of Classification Search
  CPC .......................... H04L 63/1408; H04L 63/1425
  USPC ................................................. 726/23, 22, 25
  See application file for complete search history.

(56) References Cited

U.S. PATENT DOCUMENTS

| | | | |
|---|---|---|---|
| 8,082,349 B1* | 12/2011 | Bhargava et al. | 709/227 |
| 8,301,901 B2 | 10/2012 | Buss | |
| 8,370,389 B1 | 2/2013 | Dotan | |
| 8,392,420 B2 | 3/2013 | Mellmer et al. | |
| 8,571,990 B2 | 10/2013 | Buss | |
| 8,621,586 B1 | 12/2013 | Peer et al. | |
| 8,631,038 B2 | 1/2014 | Mellmer et al. | |
| 8,781,975 B2 | 7/2014 | Bennett et al. | |
| 8,856,923 B1 | 10/2014 | Kolman et al. | |
| 8,875,255 B1 | 10/2014 | Dotan et al. | |
| 8,875,267 B1 | 10/2014 | Kolman et al. | |
| 8,904,496 B1 | 12/2014 | Bailey et al. | |
| 8,978,159 B1 | 3/2015 | van Dijk et al. | |
| 2001/0047406 A1* | 11/2001 | Araujo et al. | 709/223 |
| 2009/0138592 A1* | 5/2009 | Overcash et al. | 709/224 |
| 2009/0227282 A1* | 9/2009 | Miyabayashi et al. | 455/552.1 |
| 2010/0058118 A1* | 3/2010 | Yamaoka | 714/48 |
| 2014/0101764 A1* | 4/2014 | Montoro | 726/23 |
| 2014/0189098 A1* | 7/2014 | MaGill et al. | 709/224 |
| 2014/0359777 A1* | 12/2014 | Lam et al. | 726/25 |
| 2014/0380473 A1* | 12/2014 | Bu et al. | 726/23 |

* cited by examiner

*Primary Examiner* — Haresh N Patel
(74) *Attorney, Agent, or Firm* — BainwoodHuang

(57) ABSTRACT

A technique detects riskiness of a communication in a network based on behavior profiling. The technique involves generating a network history baseline (e.g., normal and abnormal behavior profiles) from prior network communications occurring in the network. The technique further involves, for a new network communication, assigning the new network communication a risk score based on a comparison of the new network communication to the network history baseline. The risk score is a numerical measure of behavioral normalcy relative to the prior network communications occurring in the network. The technique further involves providing an output signal having a first value when the risk score is above a predefined risk threshold to indicate that the communication is risky, and a second value which is different than the first value when the risk score is below the predefined risk threshold to indicate that the communication is not risky.

25 Claims, 5 Drawing Sheets

DETECTING RISKY NETWORK COMMUNICATIONS BASED ON EVALUATION USING NORMAL AND ABNORMAL BEHAVIOR PROFILES

BACKGROUND

One conventional approach to preventing malicious activity on a computer network is to scan network traffic for malicious signatures listed on a signature blacklist. For example, network devices such as a firewall can be configured to block network traffic containing a specific domain (i.e., website), a specific IP address, or a specific Uniform Resource Locator (URL). Some network devices may even block network traffic if the network devices find blacklisted signatures within files, javascript and/or Flash objects.

Another conventional approach to preventing malicious activity on a computer network is to intercept network traffic containing potentially malicious code and then run that code in a sandbox (i.e., a computerized platform which is isolated from the network). If the code running in the sandbox turns out to be malicious (e.g., by infecting a sandbox device with a computer virus, by attempting to spread malware, by attempting to extract data and communicate that data to an attacker's device, etc.), the effects are contained and prevented from spreading to devices on the network.

SUMMARY

Unfortunately, there are deficiencies to the above-described conventional approaches to preventing malicious activity on a computer network. For example, there are many threats that go undetected by blacklists such as those having newer malicious signatures that have not yet been added to the blacklists Additionally, experimenting with potentially malicious code in a sandbox typically requires close and extensive attention from a human expert.

In contrast to the above-described conventional approaches to preventing malicious activity, improved techniques are directed toward detecting risky communications by establishing a network history baseline having profiles which describe network behavior and source/destination interaction, and then comparing new communications to the network history baseline. A communication that is abnormal to normal behavior defined by normal behavior profiles of the baseline (i.e., anomaly detection) is considered risky. Additionally, a communication that is similar to abnormal behavior defined by abnormal behavior profiles of the baseline (i.e., pattern matching) is considered risky as well. Such techniques complement conventional threat detection approaches (e.g., blacklists and sandbox evaluation) by focusing on behavior and interaction between network sources and destinations (e.g., users and websites).

One embodiment is directed to a method of detecting risky communication in a network. The method includes generating, by processing circuitry, a network history baseline from prior network communications occurring in the network. The method further includes, for a new network communication, assigning, by the processing circuitry, a risk score to the new network communication based on a comparison of the new network communication to the network history baseline. The risk score is a numerical measure of behavioral normalcy relative to the prior network communications occurring in the network. The method further includes providing, by the processing circuitry, an output signal having a first value when the risk score is above a predefined risk threshold to indicate that the risk score exceeds the predefined risk threshold (i.e., the communication is deemed risky), and a second value which is different than the first value when the risk score is below the predefined risk threshold to indicate that the risk score does not exceed the predefined risk threshold (i.e., the communication is deemed not risky).

In some arrangements, the new network communication includes a Hypertext Transfer Protocol (HTTP) message exchanged between a source device and a destination device in the network. In these arrangements, assigning the new network communication the risk score includes deriving the risk score based on a comparison between (i) HTTP attributes of the HTTP message and (ii) HTTP attribute metrics of the network history baseline. It should be understood that, although some organizations may restrict communications down to using only essential protocols for security purposes, HTTP often remains used in these situations.

In some arrangements, the network history baseline includes a set of profiles that describes behavior of source devices and destination devices in the network. In these arrangements, deriving the risk score based on the comparison between (i) the HTTP attributes of the HTTP message and (ii) the HTTP attribute metrics of the network history baseline includes performing a set of evaluation operations which evaluates the HTTP attributes of the HTTP message against the set of profiles to identify an amount of normalcy for the HTTP message.

In some arrangements, the set of profiles includes normal behavior profiles representing normal network communications. In these arrangements, performing the set of evaluation operations which evaluates the HTTP attributes of the HTTP message against the set of profiles includes performing a set of anomaly detection operations to gauge difference between the HTTP attributes of the HTTP message and the normal behavior profiles, the risk score being based at least in part on the gauged difference.

In some arrangements, the set of profiles includes abnormal behavior profiles representing abnormal network communications. In these arrangements, performing the set of evaluation operations which evaluates the HTTP attributes of the HTTP message against the set of profiles includes performing a set of pattern matching operations to gauge difference between the HTTP attributes of the HTTP message and the abnormal behavior profiles, the risk score being based at least in part on the gauged difference.

In some arrangements the processing circuitry performs the set of evaluation operations in accordance with a set of operating parameters. In these arrangements, the method further includes adjusting the set of operating parameters based on previous risk score results to improve accuracy of the set of evaluation operations in a machine learning manner.

In some arrangements, each of the prior network communications includes a set of HTTP-based attributes (e.g., time, source IP address, destination IP address, domain, HTTP POST, user-agent string, HTTP method, full URL, HTTP status code, duration, timezone, website geolocation, the amount of data transmitted, the referrer and other header information, bytes sent/received, HTTP cookie presence, referrer address, employee location, employee department, combinations thereof, and so on). In these arrangements, generating the network history baseline from the prior network communications occurring in the network includes selecting particular HTTP-based attributes of the set of HTTP-based attributes, and constructing multiple profiles for the particular HTTP-based attributes selected from the set of HTTP-based attributes. Each profile is constructed for a particular HTTP-based attribute.

In some arrangements, constructing multiple profiles for the particular HTTP-based attributes selected from the set of HTTP-based attributes can include creating, for each website accessed by the prior network communications, a respective domain profile to describe behavior associated with that website. In these arrangements, the respective domain profile created for each website can include count and frequency data aggregated over different time periods spanning different amounts of time.

In some arrangements, constructing multiple profiles for the particular HTTP-based attributes selected from the set of HTTP-based attributes includes creating, for each user agent string used by the prior network communications, a respective user agent string profile to describe behavior associated with that user agent string. In these arrangements, the respective user agent string profile created for each user agent string can include count and frequency data aggregated over multiple time periods spanning different amounts of time.

It should be understood that, in the cloud context, the processing circuitry can be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in detecting risky network communications based on behavior profiling.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to detecting riskiness of a communication in a network based on behavior profiling. The technique involves establishing a network history baseline having profiles which describe network behavior and source/destination interaction, and then comparing new communications to the network history baseline. A communication that is abnormal to normal behavior defined by normal behavior profiles of the baseline (i.e., anomaly detection) is considered risky. Furthermore, a communication that is similar to abnormal behavior defined by abnormal behavior profiles of the baseline (i.e., pattern matching) is considered risky as well. Such techniques complement conventional threat detection approaches (e.g., blacklists and sandbox evaluation) by focusing on behavior and interaction between network sources and destinations (e.g., users and websites).

Figure 1:
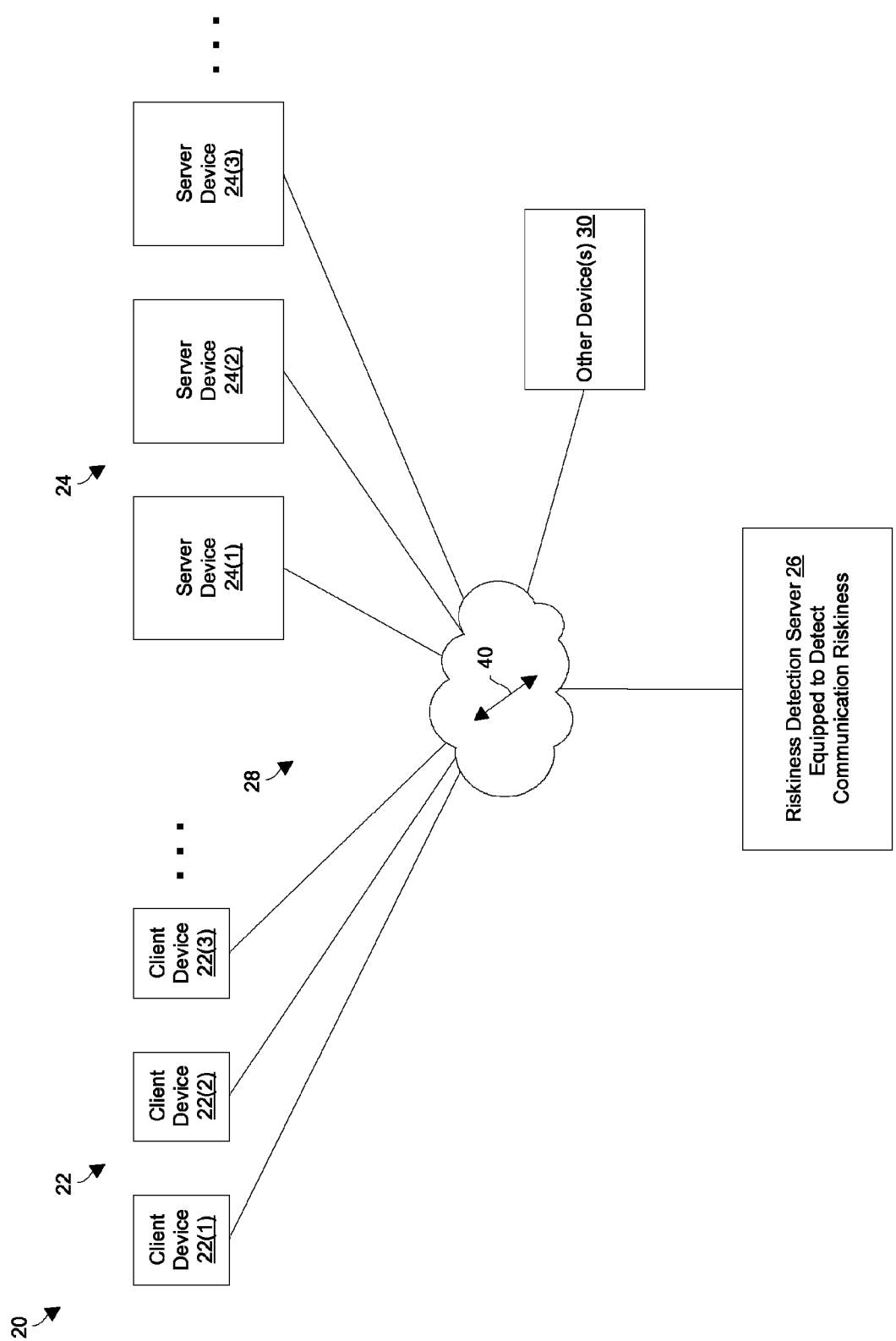
FIG. 1 is a block diagram of an electronic environment which detects communication riskiness based on behavior profiling.

FIG. 1 shows an electronic environment 20 which is equipped to detect risky communications based on behavior profiling. The electronic environment 20 includes client devices 22(1), 22(2), 22(3), . . . (collectively, client devices 22), server devices 24(1), 24(2), 24(3), . . . (collectively, server devices 24), standalone equipment 26(1), a riskiness detection server 26, a communications medium 28, and perhaps other devices 30 as well.

Each client device 22 is constructed and arranged to acquire services from one or more of the server devices 24. Some examples of suitable client devices 22 include computerized user apparatus such as personal computers, laptops, tablets, smart phones, other devices that are capable of running browsers, and the like.

Each server device 24 is constructed and arranged to provide services to one or more of the client devices 22. Some examples of suitable server devices 24 include institutional or enterprise scale server apparatus such as web servers, file servers, and so on.

The riskiness detection server 26 is constructed and arranged to evaluate riskiness of network communications 40 (e.g., HTTP messages sent between sources and destinations) among the various devices 22, 24 of the electronic environment 20. In particular, the riskiness detection server 26 compares particular attributes of these communications 40 with a set of behavior profiles (e.g., normal behavior profiles and abnormal behavior profiles) and, based on such comparison, assigns risk scores to the network communications 40. The assigned risk scores provide measures of riskiness which can be used for further action, e.g., blocking further communication, flagging for further investigation, prioritizing attention, and so on.

The communications medium 28 is constructed and arranged to connect the various components of the electronic network 20 together to enable these components to exchange electronic signals. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, and so on.

The other devices 30 represent miscellaneous apparatus that may share use of the communications medium 28. Examples of other devices 30 include network equipment, ancillary appliances, potentially malicious devices, and so on.

During operation, the various components of the electronic environment 20 communicate with each other to perform useful work. During such operation, the riskiness detection server 26 initially collects network data and then builds a network history baseline from the collected network data. Such operation of the riskiness detection server 26 may involve machine learning in which operating parameters of the circuitry of the riskiness detection server 26 are adjusted based on previous results to more accurately discern normal behavior from abnormal behavior. In particular, the riskiness detection server 26 generates (i) normal behavior profiles which described normal behavior and (ii) abnormal behavior profiles which describe abnormal behavior. The methodology for creating these profiles will be explained in further detail shortly.

After the riskiness detection server 26 has created the network history baseline, the riskiness detection server 26 assigns risk scores to new network communications 40 using the network history baseline. Each risk score is a numerical measure of behavioral normalcy relative to the prior network communications occurring in the network.

Additionally, the riskiness detection server 26 compares each risk score corresponding to a communication 40 to a predefined threshold score, or a particular predefined threshold score from a set of predefined threshold scores depending on the matching of particular attributes (e.g., communications 40 with different attributes may have different predefined threshold scores). If the risk score is lower than the predefined threshold score, the corresponding communication 40 is considered not risky. However, if the risk score is higher than the predefined threshold score, the corresponding communication 40 is considered risky and the communication 40 is handled differently than non-risky communications (e.g., blocked, flagged, etc.).

In some arrangements, each communication 40 includes a Hypertext Transfer Protocol (HTTP) message exchanged between a source device and a destination device. In these arrangements, the attributes of the communication 40 which are evaluated can include time, source IP address, destination IP address, domain, HTTP POST, user-agent string, HTTP method, full URL, HTTP status code, duration, timezone, website geolocation, the amount of data transmitted, the referrer and other header information, bytes sent/received, HTTP cookie presence, referrer address, employee location, employee department, combinations thereof, as well as others.

It should be understood that, although the riskiness detection server 26 is shown in FIG. 1 as residing off of a branch of the communications medium 28, there are a variety of suitable locations for the riskiness detection server 26 within the electronic environment 20 depending on the particular type of electronic environment 20. In some arrangements, the electronic environment 20 is large-scale enterprise network, and riskiness detection server 26 resides in one or more firewalls or gateways that separate the enterprise network from a public network in an inline manner. In other arrangements, the electronic environment 20 is a public network perhaps and the specialized firewall/gateway may separate different segments of the public network. In yet another arrangement, the electronic environment 20 is any network and the riskiness detection server 26 is simply an appliance attached to the network (e.g., a device which hooks into a network traffic blocking or filtering system, etc.). Other types of electronic environments and/or locations are suitable for use as well.

It should be further understood that, in some arrangements, the communications data that is collected and analyzed is organization-wide or even across multiple organizations (e.g., where the data is gathered at least in part from a public network). The profiles are then created and the riskiness detection server 26 looks for abnormal communications which stand out. Further details will now be provided with reference to FIG. 2.

Figure 2:
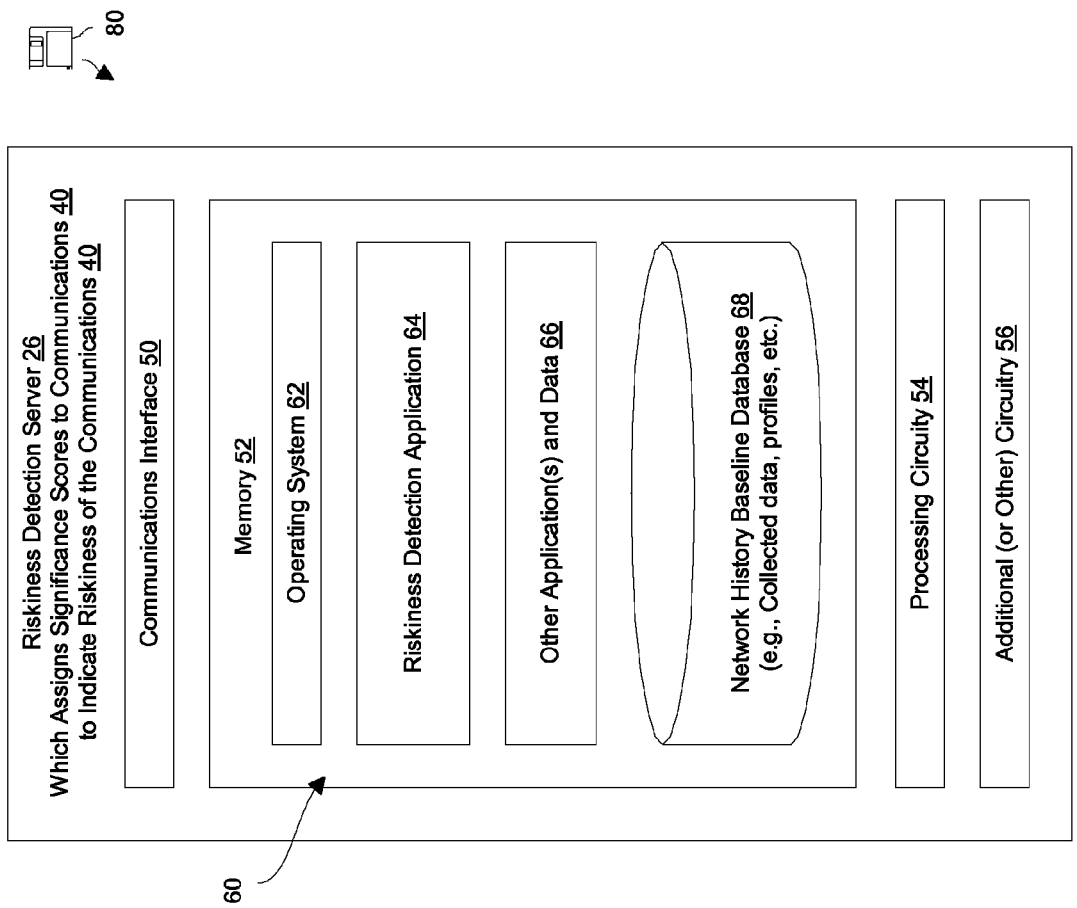
FIG. 2 is a block diagram of a riskiness detection server of the electronic environment of FIG. 1.

FIG. 2 shows particular details of the riskiness detection server 26 (also see FIG. 1). The riskiness detection server 26 includes a communications interface 50, memory 52, processing circuitry 54, and additional (or other) circuitry 56.

The communications interface 50 is constructed and arranged to connect the riskiness detection server 26 to the communications medium 28 to enable communications with other components of the electronic network 20 (FIG. 1). Additionally, the communications interface 50 enables the riskiness detection server 26 to potentially intercept and block communications if necessary based on risk scores.

The memory 52 is intended to represent both volatile storage (e.g., DRAM, SRAM, etc.) and non-volatile storage (e.g., flash memory, etc.). The memory 52 stores a variety of software constructs 60 including an operating system 62 to manage resources of the riskiness detection server 26, a riskiness detection application 64 to detect risky communications 40, other applications and data 66 (e.g., operating parameters, utilities, backend processing routines, reporting routines, etc.), and a network history database 68 (e.g., collected data, behavior profiles, etc.).

The processing circuitry 54 is constructed and arranged to operate in accordance with the various software constructs 60 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 60 to the riskiness detection server 26. The computer program product 80 has a non-transitory (or non-volatile) computer readable medium which stores a set of instructions which controls one or more operations of the riskiness detection server 26. Examples of suitable computer readable storage media include tangible articles of manufacture and apparatus which store instructions in a non-volatile manner such as CD-ROM, flash memory, disk memory, tape memory, and the like.

The additional circuitry 56 represents other portions of the riskiness detection server 26. For example, the riskiness detection server 26 may include a user interface to enable a user to locally operate the riskiness detection server 26.

During operation, the processing circuitry 54 runs the riskiness detection application 64 to form specialized control circuitry which performs riskiness detection of communications 40 between sources and destinations (also see FIG. 1). In particular, the riskiness detection application 64 forms and maintains, as a network history baseline, a set of behavior profiles which describe normal and abnormal behavior within the electronic environment 20. The behavior profiles are constructed from count and frequency data generated from prior communications 40 occurring in the electronic environment 20.

In some arrangements, the communications 40 include HTTP messages which pass between the client devices 22 (running web browsers) and server devices 24 (running web server applications), also see FIG. 1. HTTP messages are common even in environments which restrict network communications down to only essential protocols. Furthermore, HTTP messages offer a rich set of attributes from which to derive the behavior profiles.

Additionally, the control circuitry of the riskiness detection server 26 assigns risk scores to new communications 40 based on comparisons of the communications 40 to the network history baseline (i.e., based on which communications 40 are determined to be abnormal from comparison to the behavior profiles). Each risk score is a numerical measure of behavioral normalcy relative to the prior communications 40 occurring in the electronic environment 20.

The control circuitry further provides an output signal having a first value when a risk score is above a predefined risk threshold to indicate that the risk score exceeds the predefined risk threshold (i.e., the communication 40 is considered risky), and a second value which is different than the first value when the risk score is below the predefined risk threshold to indicate that the risk score does not exceed the predefined risk threshold (i.e., the communication 40 is considered not risky). In this manner, the output of the riskiness detection server 26 can be used to preventing malicious activity from occurring in the electronic environment 20 in the future (e.g., by blocking communications 40, by focusing attention on certain sources of malicious activity, by prioritizing attention, etc.). Further details will now be provided with reference to FIGS. 3 and 4.

Figure 3:
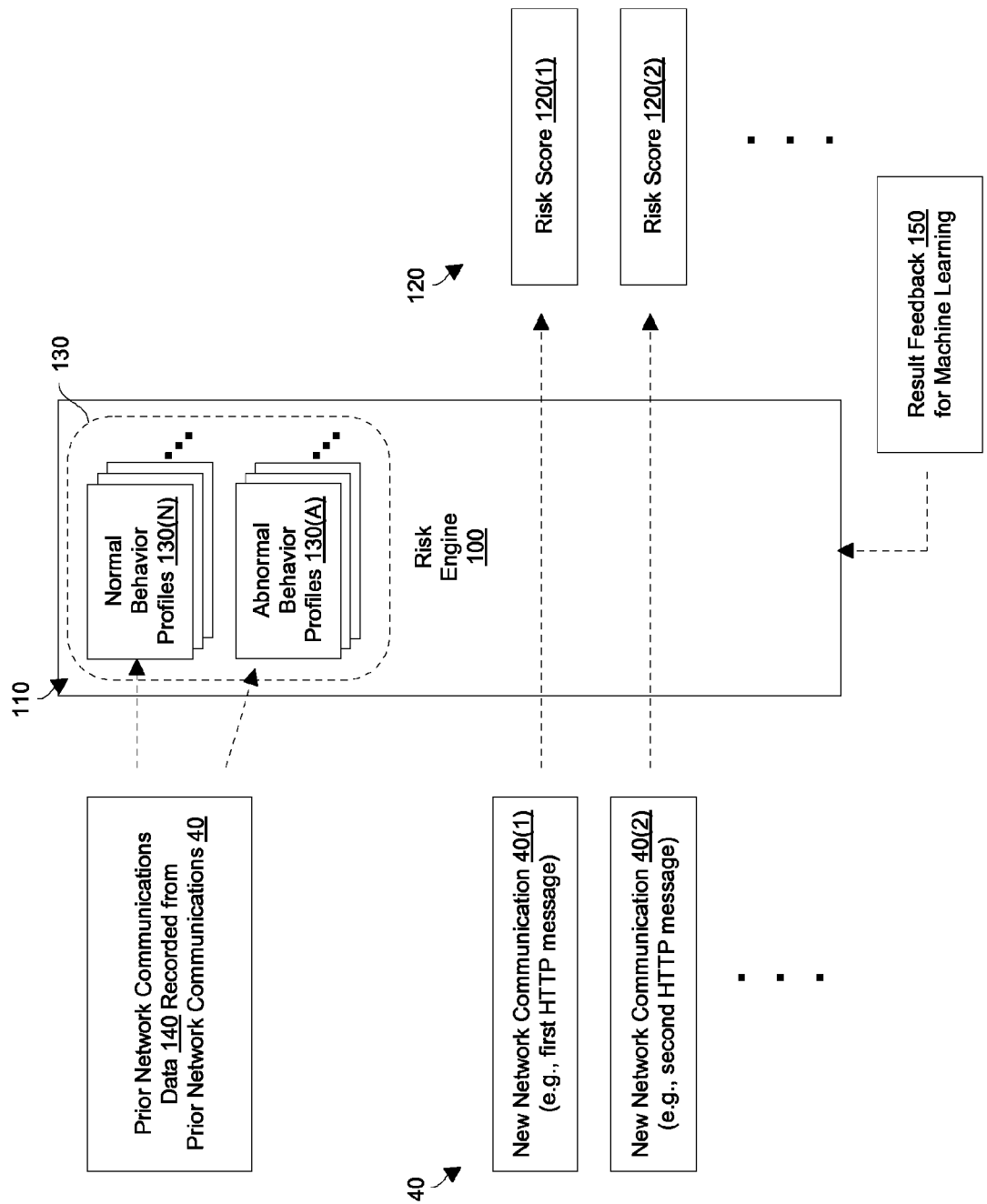
FIG. 3 is a block diagram of particular operating details of the riskiness detection server of FIG. 2.
Figure 4:
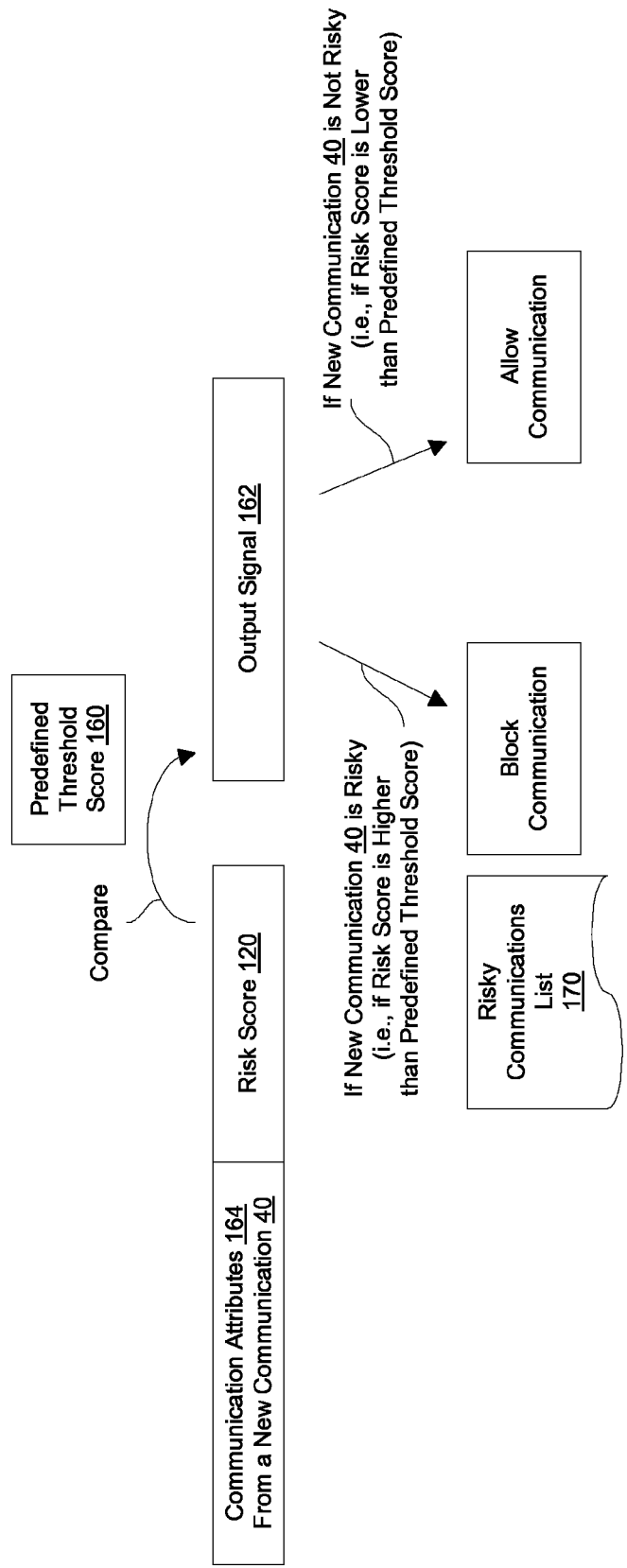
FIG. 4 is a block diagram of further operating details of the riskiness detection server of FIG. 2.

FIGS. 3 and 4 provide particular details of how a risk engine 100 of the riskiness detection server 26 forms a network history baseline 110, generates risk scores 120(1), 120(2), . . . (collectively, risk scores 120) for communications 40(1), 40(2), . . . (collectively, communications 40) based on comparison of communications attributes to the baseline 110, and operates to provide security based on the risk scores 120. FIG. 3 shows particular operating details of the riskiness detection server 26 when generating the baseline 110 and the risk scores 120. FIG. 4 shows further operating details when utilizing the risk scores 120.

For illustrative purposes, the operation will be described from the perspective of protecting an organization's enterprise network (e.g., a corporate network). However, it should be understood that the operation is suitable for a variety of other settings (e.g., a home office setting, a SOHO setting, a small business LAN, and so on).

As shown in FIG. 3, the risk engine 100 (i.e., the processing circuitry 54 running the riskiness detection application 64, also see FIG. 2) initially generates, as the network history baseline 110, a set of profiles 130 including normal behavior profiles 130(N) and abnormal behavior profiles 130(A) from prior network communications data 140. In particular, for a period of time (e.g., an initial configuration or learning phase), every communication 40 to any URL from within the organization is recorded with the following information (among others):

Time
Source IP
Destination IP
Domain
HTTP HOST
User Agent String (UAS)
HTTP Method
Full URL
HTTP Status code
Duration
Timezone
Location
Amount of data transmitted and its direction
Referrer and header This recorded information is shown in FIG. 3 as the prior network communications data 140.

It should be understood that the prior network communications data 140 includes a combination of information which is extractable directly from the communications 40 (e.g., HTTP attributes from HTTP messages) and other information which is derivable from the communications 40. For example, the prior network communications data 140 may include derived data such as the total number of bytes sent/received, HTTP cookie presence, referrer address, employee location, employee department, and so on. Moreover, one will appreciate that, in settings other than the corporate example setting, other attributes are suitable for use as well.

With the prior network communication data 140 now available, the risk engine 100 constructs the profiles 130 from for key attributes which are later used to determine the riskiness of a new communication 40. Examples of suitable profiles include domain profiles and user-agent string profiles.

For example, for a particular domain (e.g., website.com), the risk engine 100 can automatically compute the following metrics from the prior network communications data 140 as follows:

For the last 1 day, 1 week, 2 weeks, 4 weeks and 6 months, the risk engine 100 generates for each domain the following data:
Number of distinct Source IP addresses
Number of distinct Destination IP addresses
Number of distinct Full URLs
Number of distinct User Agent Strings
Frequency of each HTTP Method
Frequency of returned HTTP Status Code Similarly, for each user-agent string (UAS) encountered in the prior network communications data 140, the risk engine 100 can automatically compute the following metrics from the prior network communications data 140 as follows:

For the last 1 day, 1 week, 2 weeks, 4 weeks and 6 months, the risk engine 100 generates for each UAS the following data:
Number of distinct Source IP addresses
Number of distinct Destination IP addresses
Number of distinct Domains this UAS has communicated with
Frequency of each HTTP Method
Frequency of returned HTTP Status Code It should be understood that each of these profiles 130 on its own provides important behavior information on the given attribute. For example, domains with many distinct source IP addresses and many user agent strings are probably more popular than those with less. This fact as well as other access-pattern information can later be used to determine the riskiness of a new communication 40.

After the profiles 130 have been created, the risk engine 100 is ready to identify suspicious and malicious new communications 40 based on comparison of attributes of the new communications 40 with the network history baseline 110. In particular, one should appreciate that this technique is reactive and designed to identify risky activity that is likely to be missed by a conventional signature-based solutions. Along these lines, the risk engine 100 uses the profiles 130 to apply a probabilistic-based risk assessment method to each new communication 40, revealing the most suspicious ones.

In use, the risk engine 100 is able to identify new communications 40 which are abnormal to the network history baseline 110 via anomaly detection and pattern matching. Along these lines, the risk engine 100 is able to automatically compute certain posterior probability factors such as, for a domain of a new communication 40:

Whether the current domain is popular? (based on probability of a given connection compared to the probabilities of other connections)
How likely is the particular UAS to occur on the current domain?
Compared to other domains, how likely is it that the current domain always has only one User Agent String?
What is the probability of having no HTTP Cookie on the current domain for the 3rd connection? Or for the 300th connection?
Is the current domain being accessed at relatively fixed intervals?

Is the current domain being accessed around the clock or during work hours?

What is the probability of the current domain is always being called with a POST method?

Using the above posterior probabilities, the risk engine 100 is capable of automatically performing anomaly detection as follows:

A new communication 40 with unexpected values or set of values may involve malicious sites. Hence, the overall posterior probability attribute's values are extracted from the new communication 40. The risk engine 100 can use both unconditional and conditional probabilities, that is, $P(X=Xi)$ and $P(X=Xi|Entity=Entityj)$. The risk score 120 of the new communication 40 is based on the normalized distance of the posterior probability from a pre-defined threshold. The threshold can be dynamically set per new communication 40.

For example, a domain with many different user-agents that communicate with it, but only few distinct users, will probably have a high anomaly score and will be handled as suspicious.

Additionally, using the above posterior probabilities, the risk engine 100 is capable of performing pattern matching as follows:

Specific patterns that are suspected to be the fingerprint of malicious sites are detected. If new communication attributes have a high similarity to one of these pre-defined patterns, then the new communication is suspicious and should be investigated. These patterns can also be learned from the data and the analyst feedback by extracting patterns that are common to malicious entities.

Examples of suspicious patterns are: domains with high HTTP GET/POST ratios—many posts and few gets; domains with large amount of transmitted data and low amount of received data. Note that since the terms high and low are relevant to the data attributes (e.g., the averaged get/post ratio over all the domains), these patterns cannot be easily stated as rules, and a data-driven approach may be required.

It should be understood that the risk engine 100 can be adjusted in a machine learning manner. That is, feedback 150 from earlier risk engine results can be input back into the risk engine 100 as teaching/training/re-training, and thus used to detect suspicious communications 40, based on the communication attributes and historical data, in the future.

FIG. 4 shows operations performed by additional control circuitry of the riskiness detection server 28 (e.g., the processing circuitry 54 running in accordance with the additional applications and data 66, also see FIG. 2). In particular, the control circuitry compares each risk score 120 for a communication 40 to a predefined threshold score 160 (or particular threshold score based on some attribute type of the communication 40), and outputs a signal 162 indicating whether that risk score 120 is above or below the predefined threshold score 160. When the risk score 120 is above the predefined risk threshold score 160, the output signal 162 indicates that the corresponding communication 40 is risky. However, when the risk score 120 is below the predefined risk threshold 160, the output signal 162 indicates that the corresponding communication 40 is not risky. Accordingly, the techniques focus on evaluation of the behavior between users and websites, by (i) establishing a baseline and (ii) identifying communications 40 (e.g., URLs) that are abnormal to the baseline, relative all the other attributes.

It should be understood that the output signal 162 can be used for a variety of purposes. For example, in the context of real-time operation, the output signal 162 can be used to block or allow the new communication 40 to pass from one network port to another. Additionally, in the context of malicious event investigation, the output signal 162 can be used as a trigger to log the attributes 164 of the new communication 40 for later evaluation by a security analyst. Furthermore, such logging of the communications attributes 164 on a list 170 enables the new communications 40 be prioritized so that the communications 40 with the highest risk scores 120 (i.e., the communications 40 considered the most risky) are analyzed ahead of less risky but still suspicious communications 40.

In some arrangements, the output signal 162 determines whether code should be injected into the new communication 40 for closer analysis. In particular, if the new communication 40 is deemed risky due to its risk score 120 exceeding the predefined threshold 160, the riskiness detection server 26 inserts code (e.g., javascript, identifiers, character strings, tracking information, etc.) into the communication 40 to gain further information from one side of the communication, the other, or both. For example, the riskiness detection server 26 can gather additional information about a particular user, URL, etc. to determine whether that entity has a genuine purposes such as performing real work, or whether that entity is malicious. Further details will now be provided with reference to FIG. 5.

Figure 5:
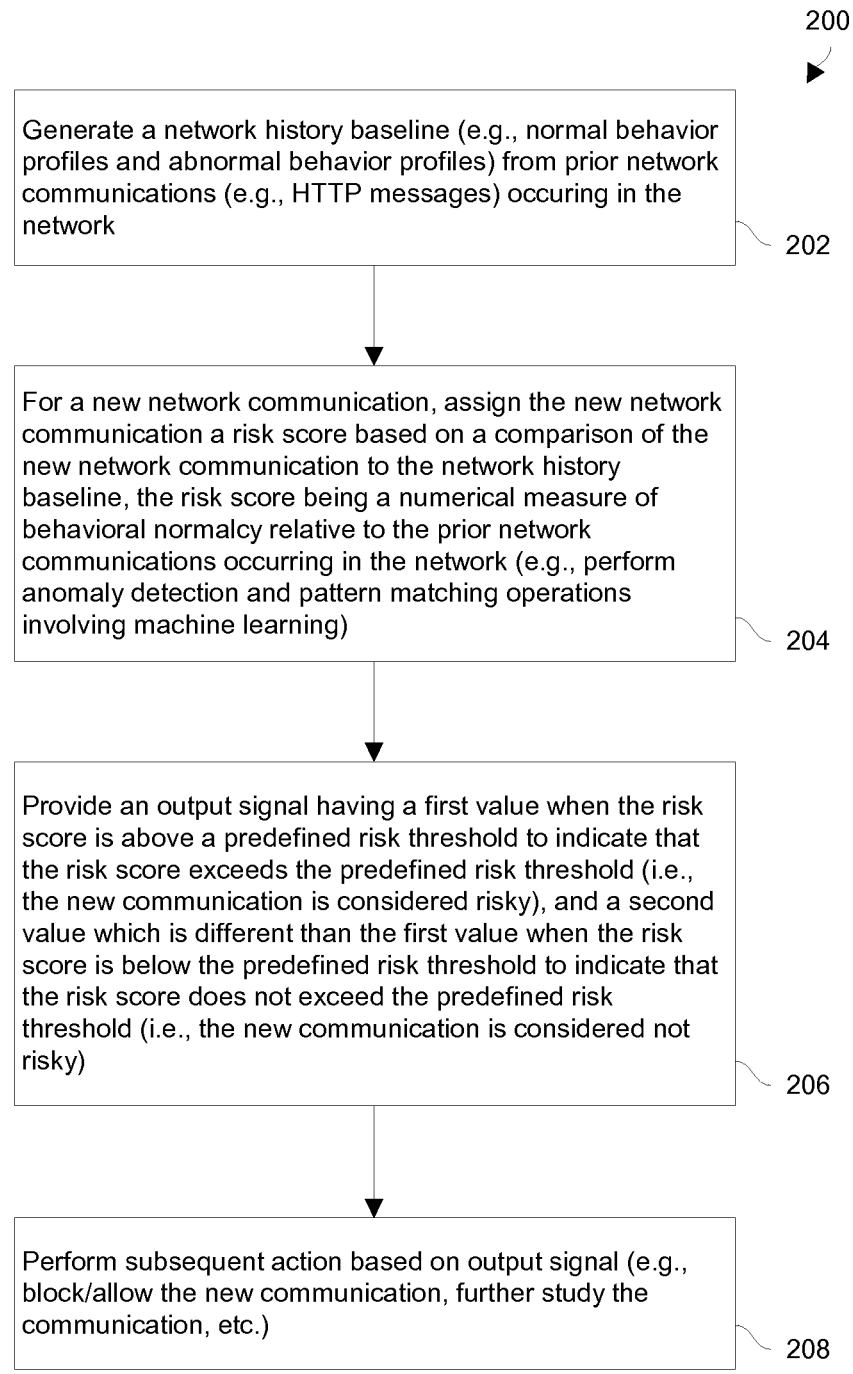
FIG. 5 is a flowchart of a procedure which is performed by the riskiness detection server of FIG. 2.

FIG. 5 is a flowchart of a procedure 200 which is performed by the riskiness detection server 26 to detect risky communication in a network. As mentioned earlier, such operation enables identification of malicious or suspicious URLs based on access-patterns.

At 202, the riskiness detection server 26 generates a network history baseline 110 from prior network communications 40 occurring in the network (also see FIG. 3). This network history baseline 110 includes normal behavior profiles 110(N) describing normal communication behavior, and abnormal behavior profiles 110(A) describing abnormal communication behavior.

At 204, the riskiness detection server 26 assigns a risk score 120 to a new network communication 40 based on a comparison of the new network communication 40 to the network history baseline 110. This risk score 120 is a numerical measure of behavioral normalcy relative to the prior network communications 40 occurring in the network.

At 206, the riskiness detection server 26 provides an output signal 162 having a first value when the risk score 120 is above a predefined risk threshold 160 to indicate that the risk score 120 exceeds the predefined risk threshold 160, and a second value which is different than the first value when the risk score 120 is below the predefined risk threshold 160 to indicate that the risk score 120 does not exceed the predefined risk threshold 160.

At 208, the riskiness detection server 26 optionally performs further action based on the output signal 162. Along these lines, the riskiness detection server 26 may block or allow the communication 40 (e.g., if integrated or hooked into a firewall, gateway, etc.). Additionally, the riskiness detection server 26 may log the communication 40 into a database of suspicious communications 40 for further studies, and so on. Such action enables prevention of malicious activity in the future.

It should be understood that the disclosed improved techniques differ from an approach that simply tries to aggregate data and then check if a current communication or event is abnormal or not. In particular, once the riskiness detection server 26 has aggregated data (e.g., collected over a minute, over an hour, over a year, etc.) perhaps over an entire organization or across multiple organizations, the riskiness detection server 26 is able to determine whether a current resource is abnormal.

For example, communications with a large enterprise news website such as CNN.COM can be evaluated from the perspective of multiple different metrics. Along these lines, users of the enterprise news website are expected to receive more data from the website than they send to the website (i.e., users of the news website probably consume more data from the news website than they share to the news website). Likewise, in connection with a very popular streaming video website such as YOUTUBE.COM, users should consume even more data from the video website than from the news website. However, in connection with a dropbox website, users may send more data than they consume, and so on. The riskiness detection server 26 evaluates current communications against the profiles on many different metrics, including distribution of browsers (user-agents) accessing it, distribution of access-times, content-type, etc.

As yet another example, suppose that a set of profiles is based on data collected over a 48 hour period. Along these lines, the riskiness detection server 26 may determine that a large search engine website such as GOOGLE.COM may have several thousand distinct source IP addresses (i.e., different users). In contrast, a malicious website (e.g., malware-.com) would not have that many users accessing it in the duration of the profile. In addition, the malicious website would likely have all traffic to it be direct and thus without any referrer and probably also without any cookies. Such behavior is different than that the large search engine (GOOGLE-.COM in this example), but probably similar to how some operating system updates act (e.g. Microsoft's Update Agent) although the updates would likely have more users. Accordingly, the riskiness detection server 26 is able to analyze profiles describing these behaviors and differentiate between GOOGLE.COM, YOUTUBE.COM, malware.com and a Microsoft update, and so on.

As described above, improved techniques are directed to detecting risky communications by establishing a network history baseline 110 having profiles 130 which describe network behavior and source/destination interaction, and then comparing new communications 40 to the network history baseline 110. A communication 40 that is abnormal to normal behavior defined by normal behavior profiles 130(N) of the baseline 110 (i.e., anomaly detection) is considered risky. Additionally, a communication 40 that is similar to abnormal behavior defined by abnormal behavior profiles 130(A) of the baseline 110 (i.e., pattern matching) is considered risky as well. Such techniques complement conventional threat detection approaches (e.g., blacklists and sandbox evaluation) by focusing on behavior and interaction between network sources and destinations (e.g., users and websites).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Along these lines, the various computer resources of the riskiness detection server 26 may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the risk engine 100 of the riskiness detection server 26 can be configured to operate automatically either in real-time or periodically. In particular, the risk engine 100 can be set up to analyze each incoming communication 40 and dynamically determine whether the communication 40 is risky; such operation is well suited for real-time network traffic control such as a firewall or a gateway in order to take immediate action on malicious entities. The risk engine 100 can also be set up to periodically analyze communications 40 which are recorded in a large database (e.g., hourly, overnight, etc.) to analyze many gigabytes of communications data at a time; such operation is well suited for providing a list of suspicious activity for further investigation (e.g., a list of suspicious communications 40 prioritized by risk score 120 for further examination by an expert analyst, etc.).

Furthermore, it should be understood that the results of operating the risk engine 100 are eventually fed back in a machine learning manner. Such training, teaching, and further modifying the performance of the risk engine 100 may involve weight adjustments, fuzzy logic, neural networks, combinations thereof, and so on.

Additionally, it should be understood that the normal behavior profiles 130(N) and the abnormal behavioral profiles 130(A) (also see FIG. 3) can be shared among different enterprises and entities. For example, such profiles 130 can be distributed to smaller companies (perhaps in a subscriber relationship with a central service) so that the smaller companies can benefit from the experience obtained by the larger entities. Such modifications and enhancements are intended to belong to various embodiments of the disclosure.

What is claimed is:

1. A method of detecting risky communication in a network, the method comprising:
    generating, by processing circuitry, a network history baseline from prior network communications occurring in the network;
    for a new network communication, assigning, by the processing circuitry, the new network communication a risk score based on a comparison of the new network communication to the network history baseline, the risk score being a numerical measure of behavioral normalcy relative to the prior network communications occurring in the network; and
    providing, by the processing circuitry, an output signal having a first value when the risk score is above a predefined risk threshold to indicate that the risk score exceeds the predefined risk threshold, and a second value which is different than the first value when the risk score is below the predefined risk threshold to indicate that the risk score does not exceed the predefined risk threshold;
wherein the network history baseline includes normal behavior profiles and abnormal behavior profiles; and wherein assigning the new network communication the risk score includes:
    performing a set of anomaly detection operations to gauge difference between Hypertext Transfer Protocol (HTTP)

attributes of the new network communication and the normal behavior profiles, and performing a set of pattern matching operations to gauge difference between the HTTP attributes of the new network communication and the abnormal behavior profiles, the risk score being based at least in part on (i) the gauged difference between the HTTP attributes of the new network communication and the normal behavior profiles and (ii) the gauged difference between the HTTP attributes of the new network communication and the abnormal behavior profiles.

2. A method as in claim 1 wherein the new network communication includes a HTTP message exchanged between a source device and a destination device in the network.

3. A method as in claim 2 wherein the normal behavior profiles and the abnormal behavior profiles form at least a portion of a set of profiles that describes behavior of source devices and destination devices in the network.

4. A method as in claim 3 wherein the normal behavior profiles represent normal network communications.

5. A method as in claim 3 wherein the abnormal behavior profiles represent abnormal network communications.

6. A method as in claim 3 wherein the processing circuitry performs the sets of anomaly detection and pattern matching operations in accordance with a set of operating parameters; and wherein the method further comprises:

adjusting the set of operating parameters based on previous risk score results to improve accuracy of the sets of anomaly detection and pattern matching operations in a machine learning manner.

7. A method as in claim 2 wherein each of the prior network communications includes a set of HTTP-based attributes; and wherein generating the network history baseline from the prior network communications occurring in the network includes:

selecting particular HTTP-based attributes of the set of HTTP-based attributes, and constructing multiple profiles for the particular HTTP-based attributes selected from the set of HTTP-based attributes, each profile being constructed for a particular HTTP-based attribute.

8. A method as in claim 7 wherein constructing multiple profiles for the particular HTTP-based attributes selected from the set of HTTP-based attributes includes:

creating, for each website accessed by the prior network communications, a respective domain profile to describe behavior associated with that website.

9. A method as in claim 8 wherein the respective domain profile created for each website includes count and frequency data aggregated over multiple time periods spanning different amounts of time.

10. A method as in claim 7 wherein constructing multiple profiles for the particular HTTP-based attributes selected from the set of HTTP-based attributes includes:

creating, for each user agent string used by the prior network communications, a respective user agent string profile to describe behavior associated with that user agent string.

11. A method as in claim 10 wherein the respective user agent string profile created for each user agent string includes count and frequency data aggregated over multiple time periods spanning different amounts of time.

12. A method as in claim 7 wherein constructing multiple profiles for the particular HTTP-based attributes selected from the set of HTTP-based attributes includes:

creating, for each website accessed by the prior network communications, a respective domain profile to describe behavior associated with that website, and creating, for each user agent string used by the prior network communications, a respective user agent string profile to describe behavior associated with that user agent string.

13. A method as in claim 1 wherein performing the set of anomaly detection operations includes:

correlating the HTTP attributes of the new network communication with a domain labeled as suspicious due to the domain communicating with a number of user-agents which is larger than a number of distinct users.

14. A method as in claim 1 wherein performing the set of pattern matching operations includes:

correlating the HTTP attributes of the new network communication with a domain labeled as suspicious due to the domain transmitting an amount of data which is greater than a predefined transmission amount and receiving an amount of data which is less than a predefined receive amount, the predefined transmission amount being larger than the predefined receive amount.

15. A method of detecting risky communication in a network, the method comprising:

generating, by processing circuitry, a network history baseline from prior network communications occurring in the network;

for a new network communication, assigning, by the processing circuitry, the new network communication a risk score based on a comparison of the new network communication to the network history baseline, the risk score being a numerical measure of behavioral normalcy relative to the prior network communications occurring in the network; and providing, by the processing circuitry, an output signal having a first value when the risk score is above a predefined risk threshold to indicate that the risk score exceeds the predefined risk threshold, and a second value which is different than the first value when the risk score is below the predefined risk threshold to indicate that the risk score does not exceed the predefined risk threshold;

wherein the new network communication includes a Hypertext Transfer Protocol (HTTP) message exchanged between a source device and a destination device in the network; and wherein assigning the new network communication the risk score includes:

deriving the risk score based on a comparison between (i) HTTP attributes of the HTTP message and (ii) HTTP attribute metrics of the network history baseline;

wherein each of the prior network communications includes a set of HTTP-based attributes; and wherein generating the network history baseline from the prior network communications occurring in the network includes:

selecting particular HTTP-based attributes of the set of HTTP-based attributes, and constructing multiple profiles for the particular HTTP-based attributes selected from the set of HTTP-based attributes, each profile being constructed for a particular HTTP-based attribute;

wherein constructing multiple profiles for the particular HTTP-based attributes selected from the set of HTTP-based attributes includes:

creating, for each website accessed by the prior network communications, a respective domain profile to describe behavior associated with that website, and creating, for each user agent string used by the prior network communications, a respective user agent string profile to describe behavior associated with that user agent string;

wherein the respective domain profile created for each website includes count and frequency data aggregated over different time periods spanning different amounts of time; and wherein the respective user agent string profile created for each user agent string includes count and frequency data aggregated over different time periods spanning different amounts of time.

16. An electronic apparatus, comprising:

memory; and control circuitry coupled to the memory, the memory storing instructions which, when carried out by the control circuitry, cause the control circuitry to:

generate a network history baseline from prior network communications occurring in the network, for a new network communication, assign the new network communication a risk score based on a comparison of the new network communication to the network history baseline, the risk score being a numerical measure of behavioral normalcy relative to the prior network communications occurring in the network, and provide an output signal having a first value when the risk score is above a predefined risk threshold to indicate that the risk score exceeds the predefined risk threshold, and a second value which is different than the first value when the risk score is below the predefined risk threshold to indicate that the risk score does not exceed the predefined risk threshold;

wherein the network history baseline includes normal behavior profiles and abnormal behavior profiles; and wherein the control circuitry, when assigning the new network communication the risk score, is constructed and arranged to:

perform a set of anomaly detection operations to gauge difference between Hypertext Transfer Protocol (HTTP) attributes of the new network communication and the normal behavior profiles, and perform a set of pattern matching operations to gauge difference between the HTTP attributes of the new network communication and the abnormal behavior profiles, the risk score being based at least in part on (i) the gauged difference between the HTTP attributes of the new network communication and the normal behavior profiles and (ii) the gauged difference between the HTTP attributes of the new network communication and the abnormal behavior profiles.

17. An electronic apparatus as in claim 16 wherein each of the prior network communications includes a set of HTTP-based attributes; and wherein the control circuitry, when generating the network history baseline from the prior network communications occurring in the network, is constructed and arranged to:

select particular HTTP-based attributes of the set of HTTP-based attributes, and construct multiple profiles for the particular HTTP-based attributes selected from the set of HTTP-based attributes, each profile being constructed for a particular HTTP-based attribute.

18. An electronic apparatus as in claim 17 wherein the control circuitry, when constructing the multiple profiles, is constructed and arranged to:

create, for each website accessed by the prior network communications, a respective domain profile to describe behavior associated with that website, and create, for each user agent string used by the prior network communications, a respective user agent string profile to describe behavior associated with that user agent string;

wherein the respective domain profile created for each website includes count and frequency data aggregated over different time periods spanning different amounts of time; and wherein the respective user agent string profile created for each user agent string includes count and frequency data aggregated over different time periods spanning different amounts of time.

19. An electronic apparatus as in claim 16 wherein the new network communication includes a HTTP message exchanged between a source device and a destination device in the network.

20. An electronic apparatus as in claim 19 wherein the normal behavior profiles and the abnormal behavior profiles form at least a portion of a set of profiles that describes behavior of source devices and destination devices in the network.

21. A computer program product having a non-transitory computer readable medium which stores a set of instructions to detect risky communication in a network, the set of instructions, when carried out by computerized circuitry, causing the computerized circuitry to perform a method of:

generating a network history baseline from prior network communications occurring in the network;

for a new network communication, assigning a risk score to the new network communication based on a comparison of the new network communication to the network history baseline, the risk score being a numerical measure of behavioral normalcy relative to the prior network communications occurring in the network; and providing an output signal having a first value when the risk score is above a predefined risk threshold to indicate that the risk score exceeds the predefined risk threshold, and a second value which is different than the first value when the risk score is below the predefined risk threshold to indicate that the risk score does not exceed the predefined risk threshold;

wherein the network history baseline includes normal behavior profiles and abnormal behavior profiles; and wherein assigning the risk score to the new network communication includes:

performing a set of anomaly detection operations to gauge difference between Hypertext Transfer Protocol (HTTP) attributes of the new network communication and the normal behavior profiles, and performing a set of pattern matching operations to gauge difference between the HTTP attributes of the new network communication and the abnormal behavior profiles, the risk score being based at least in part on (i) the gauged difference between the HTTP attributes of the new network communication and the normal behavior profiles and (ii) the gauged difference between the HTTP attributes of the new network communication and the abnormal behavior profiles.

22. A computer program product as in claim 21 wherein the new network communication includes a HTTP message exchanged between a source device and a destination device in the network.

23. A computer program product as in claim 22 wherein the normal behavior profiles and the abnormal behavior profiles form at least a portion of a set of profiles that describes behavior of source devices and destination devices in the network.

24. A computer program product as in claim 21 wherein each of the prior network communications includes a set of HTTP-based attributes; and wherein generating the network history baseline from the prior network communications occurring in the network includes:
- selecting particular HTTP-based attributes of the set of HTTP-based attributes, and
- constructing multiple profiles for the particular HTTP-based attributes selected from the set of HTTP-based attributes, each profile being constructed for a particular HTTP-based attribute.

25. A computer program product as in claim 24 wherein constructing the multiple profiles includes:
- creating, for each website accessed by the prior network communications, a respective domain profile to describe behavior associated with that website, and
- creating, for each user agent string used by the prior network communications, a respective user agent string profile to describe behavior associated with that user agent string;
- wherein the respective domain profile created for each website includes count and frequency data aggregated over different time periods spanning different amounts of time; and
- wherein the respective user agent string profile created for each user agent string includes count and frequency data aggregated over different time periods spanning different amounts of time.

\* \* \* \* \*